(12) United States Patent
Borovicka et al.

(10) Patent No.: US 9,867,383 B2
(45) Date of Patent: Jan. 16, 2018

(54) SMOKER BOX WITH INTEGRATED HUMIDIFIER

(71) Applicants: Cory Thomas Borovicka, Oakland, CA (US); Charles Adams, Berkeley, CA (US)

(72) Inventors: Cory Thomas Borovicka, Oakland, CA (US); Charles Adams, Berkeley, CA (US)

(73) Assignee: Charcoal Companion Incorporated, Berkeley, CA (US)

( * ) Notice: Subject to any disclaimer, the term of this patent is extended or adjusted under 35 U.S.C. 154(b) by 866 days.

(21) Appl. No.: 13/854,873

(22) Filed: Apr. 1, 2013

(65) Prior Publication Data

US 2013/0213243 A1 Aug. 22, 2013

Related U.S. Application Data

(63) Continuation-in-part of application No. 29/406,351, filed on Nov. 11, 2011, now Pat. No. Des. 679,133.

(51) Int. Cl.
*A23B 4/03* (2006.01)
*A23B 4/052* (2006.01)
*A47J 37/07* (2006.01)

(52) U.S. Cl.
CPC ............ *A23B 4/0523* (2013.01); *A23B 4/052* (2013.01); *A47J 37/0786* (2013.01)

(58) Field of Classification Search
CPC ..... A23B 4/052; A23B 4/0523; A47J 37/0786
USPC ......... 99/324, 339, 340, 352, 444, 446, 447, 99/448, 449, 450, 467, 482, 401; 126/1, 126/1 R, 9 R, 25 R, 38, 39 R, 41 R
See application file for complete search history.

(56) References Cited

U.S. PATENT DOCUMENTS

| | | | |
|---|---|---|---|
| 3,081,692 A | 3/1963 | Sorensen | |
| 4,232,597 A * | 11/1980 | Perrine | A23B 4/052 99/468 |
| D262,595 S | 1/1982 | Martenson | |
| 4,471,749 A | 9/1984 | Galdes | |
| D289,964 S | 5/1987 | Osborne | |
| 4,697,506 A | 10/1987 | Ducate, Jr. | |
| 4,869,163 A * | 9/1989 | Haskins | A23B 4/048 126/163 R |
| 5,191,831 A * | 3/1993 | Walden | F24C 14/005 126/369 |

(Continued)

*Primary Examiner* — Dana Ross
*Assistant Examiner* — Joseph Iskra
(74) *Attorney, Agent, or Firm* — Beeson Skinner Beverly, LLP

(57) ABSTRACT

A smoker box and humidifier for a barbecue grill has a container body having a top and at least one and preferably a plurality of top opening at its top. Isolated compartments are provided in the container body. At least one of the isolated compartments is capable of holding wood chips or the like for producing a flavoring smoke, and at least one of compartments is capable of holding a liquid separate from but in close proximity to the wood chips or the like. The compartments in the container body are positioned such that, when the smoker box is heated, both the flavoring smoke and moistening vapors produced in the compartments of the container body circulate up through the top openings in the top of said container body. The container body can include a drawer with isolated compartments, which can be pulled out to replenish spent wood chips and fluids.

13 Claims, 8 Drawing Sheets

(56) References Cited

U.S. PATENT DOCUMENTS

| | | | |
|---|---|---|---|
| 5,400,703 A | 3/1995 | Ashcom et al. | |
| D363,191 S | 10/1995 | Gibson | |
| 5,865,105 A | 2/1999 | Pepelanov | |
| 7,063,007 B2 | 6/2006 | Citrynell et al. | |
| D534,034 S | 12/2006 | Chambers | |
| D559,621 S | 1/2008 | Raichlen et al. | |
| D585,702 S | 2/2009 | Borovicka et al. | |
| D588,399 S | 3/2009 | Vrbanek | |
| D647,759 S | 11/2011 | Johnson | |
| D649,399 S | 11/2011 | Johnson | |
| D651,457 S | 1/2012 | Borovicka et al. | |
| 8,132,688 B2* | 3/2012 | Martin | A23B 4/048 220/288 |
| 8,939,068 B2* | 1/2015 | Cohen | A23B 4/044 340/501 |
| 2002/0166460 A1* | 11/2002 | O'Shea | A47J 37/0786 99/482 |
| 2004/0187704 A1 | 9/2004 | Citrynell et al. | |
| 2006/0011192 A1 | 1/2006 | Citrynell et al. | |
| 2008/0257174 A1 | 10/2008 | Turner | |
| 2009/0320882 A1 | 12/2009 | Averwater | |
| 2010/0218691 A1 | 9/2010 | Adams | |

* cited by examiner

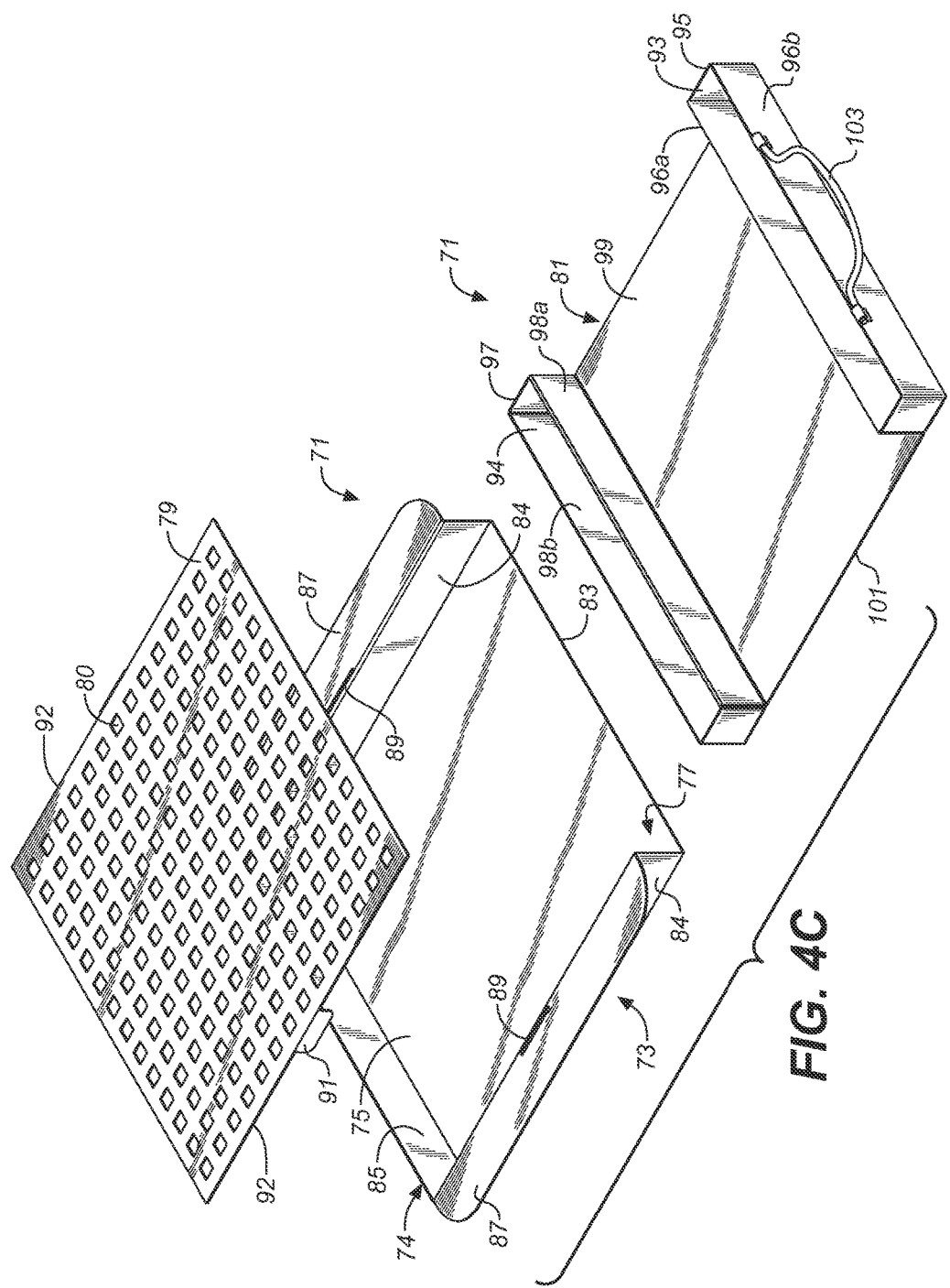

SMOKER BOX WITH INTEGRATED HUMIDIFIER

CROSS-REFERENCE TO RELATED APPLICATION

This application is a continuation-in-part of U.S. Design patent application No. 29/406,351 filed Nov. 11, 2011, now pending.

BACKGROUND OF THE INVENTION

The present invention generally relates to barbecue grilling accessories and more particularly to smoker boxes used to flavor foods being cooked on the barbecue.

Smoker boxes are often used in barbecue grills for flavoring food. Typically wood chips or the like placed in the smoker box are first soaked in water, or other liquids, such as wine, beer, or whiskey, to generate smoke when the smoker box is heated by the grill's heat source. Smoke from the smoker box circulates within the barbecue grill and infuses the food placed on the grill grate with flavor. Various food flavoring effects can be achieved by using different types of wood. For example, heavy woods, like mesquite and pecan woods, have a stronger smoke flavor than fruit woods, such as apple and cherry.

Existing smoker boxes, however, only supply flavoring smoke. They provide no facility for humidifying the air within the air space surrounding the food as it is being cooked. This is a serious drawback in that without a humid atmosphere the food can dry out and have a propensity to burn. Separate humidifiers have been devised for barbecues, but such humidifiers are typically designed to be placed near the food where they would be most effective. Such separate humidifying units also add to the equipment needed by the barbecue chef and add cost to equipping the barbecue chef with the tools he or she needs to produce the best possible cooking experiences.

The present invention greatly expands the functional capabilities of existing smoker boxes and allows the barbecue chef to introduce flavoring smoke into the barbecue chamber for flavoring the food being cooked while at the same time humidifying the atmosphere surrounding the food. The invention eliminates the need for separate humidifying devices for barbecues, and provides a means for locating the source of added humidity where it can produce the greatest impact on the barbecuing experience.

SUMMARY OF THE INVENTION

The invention is directed to a smoker box having an integrated humidifying function whereby flavoring smoke and moistening humidifier vapor, typically water vapor, can be produced and circulated up into a barbecue grill from a single device. The smoker box is comprised of a container body having a top and at least one top opening at its top through which smoke and moistening vapors can pass. At least two isolated compartments are provided in the container body. One of the at least two compartments is capable of holding wood chips or the like for producing a flavoring smoke when the smoker box is heated. The other of the at least two compartments is capable of holding a liquid separate from but in close proximity to the wood chips or the like, such that moistening vapors are produced in conjunction with flavoring smoke when the smoker box is heated. The compartments in the container body are positioned such that both the flavoring smoke and moistening vapors produced in the compartments when the smoker box is heated circulate up through the at least one top opening in the top of the container body.

In one aspect of the invention isolated wood chip and fluid compartments are self-contained within the container body. In another aspect of the invention the wood chip and fluid compartments can be provided in a drawer that can be pulled out to replenish the segregated fluids and wood chips.

In still a further aspect of the invention a top cover to the smoker box can be provided on which the food being cooked can placed for cooking.

DESCRIPTION OF THE DRAWINGS

FIG. 4C is an exploded top perspective view thereof showing more clearly the different parts of the smoker box.

DESCRIPTION OF ILLUSTRATED EMBODIMENT

Figure 1A:
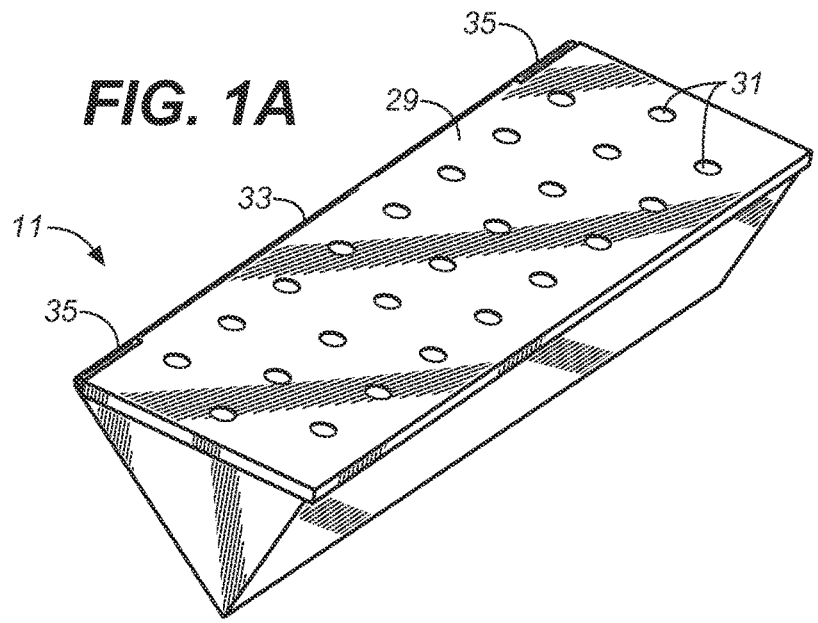
FIG. 1A is a top perspective view of a smoker box with integrated humidifier in accordance showing the invention with the lid of the smoker box in a closed position.
Figure 1B:
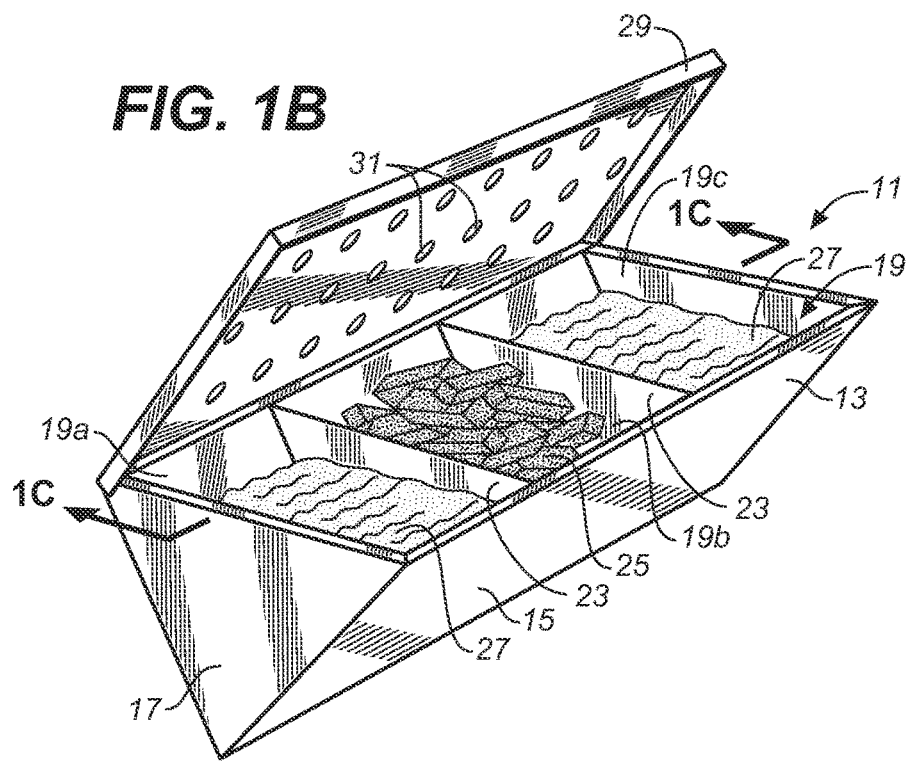
FIG. 1B is another top perspective view thereof with the lid open, showing the separate wood chip compartment and fluid compartments of the smoker box.
Figure 1C:
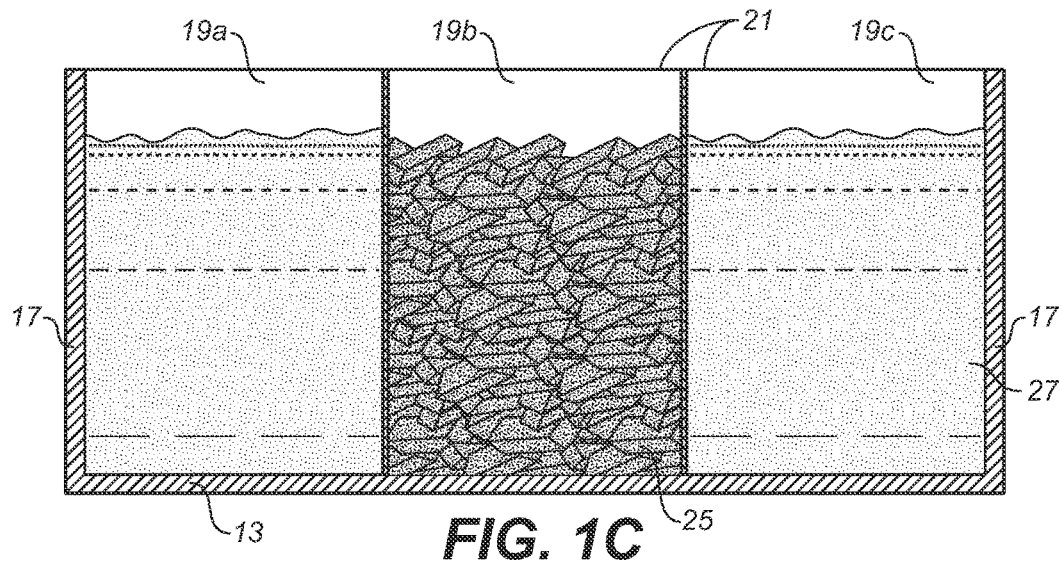
FIG. 1C is a cross-sectional view thereof in side elevation.

Referring to the drawings, FIGS. 1A-1C illustrate a first version of a smoker box which has an integrated humidifier in accordance with the invention. The smoker box 11 includes a container body 13 that is elongated and triangularly shaped (an inverted triangle) and that has angled side walls 15 and triangularly shaped end walls 17 that form an interior region 19. The top 20 of the container body is at the base of the inverted triangle and provides a top opening 21 through which wood chips or the like and a fluid or fluids, typically water, can be introduced into the interior region of the smoker box. This interior region is divided into at least two smaller isolated compartments, which include at least one compartment for holding woods chips or the like, and at least one compartment for holding a fluid in close proximity to the wood chip compartment within the same smoker box.

It is seen that, in this illustrated embodiment, there are three compartments 19a, 19b, 19c arranged side-by-side in a row of contiguous compartments. These contiguous compartments are formed by providing two divider walls 23 in interior region 19. The center compartment 19b is shown filled with wood chips 25, and the side compartments are shown filled with a fluid 27. While this is the most suitable distribution of the fluid and the wood chips between the contiguous compartments, it is possible for the wood chips and fluid to be distributed between other compartments, so long as wood chips and fluid are not placed in the same compartment. For example, it would be possible to add wood chips to the outer compartments 19a and 19c and fill or partially fill the center compartment 19b with a fluid. While the compartments are shown as contiguous compartments, the compartments need not be contiguous. However, preferably the compartments will be in close proximity to each other to concentrate the smoke from the wood chips and the rising moisture from the fluid holding compartments in the region where the food is being cooked.

It can also be seen that the smoker box 11 illustrated in FIG. 1A-1C also has a lid 29 having a plurality of vent holes 31, which covers the top opening 21 of the container body 13. Preferably, the holes in the lid are distributed evenly over the lid, however, a non-uniform hole pattern would be possible, but should extend over enough of the lid to allow both smoke from the heated wood chips and moisture from the heated fluid to pass through the lid. The lid may be a separate part that is freely removable from the top of the container body, or it may be attached to one of the longitudinal edges 33 of the container such as by hinges 35, so that the lid, which is shown in the closed position, can be pivoted to an open position for filling and emptying the smoker box.

Figure 2:
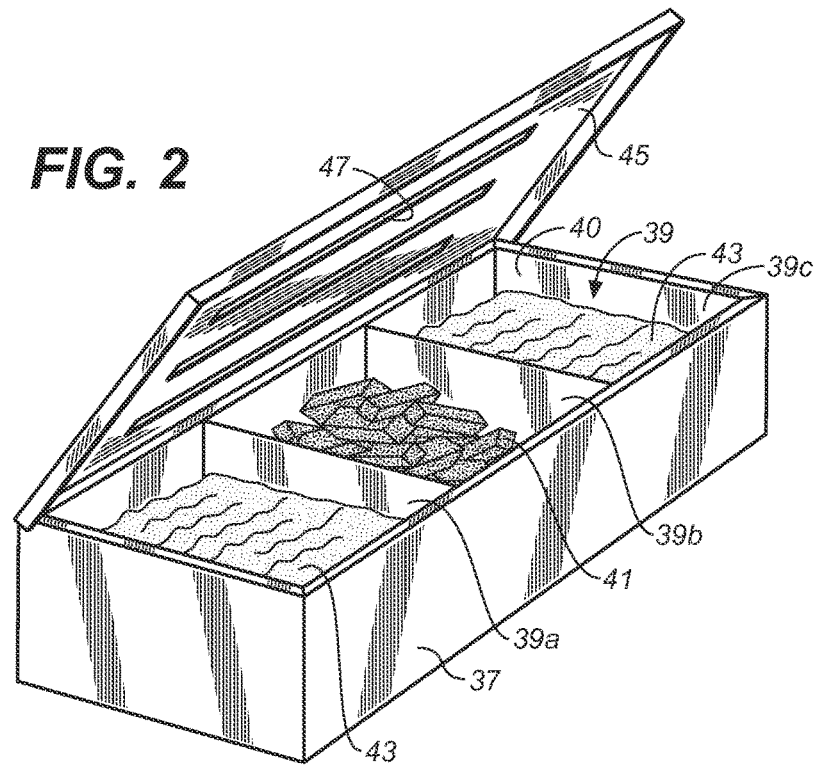
FIG. 2 is a top perspective view of another embodiment of a smoker box with an integrated humidifier in accordance with the invention showing the lid of the smoker box open.

FIG. 2 shows an alternative embodiment of a smoker box in accordance with the invention, wherein the smoker box has a generally rectangular shaped container body 37 instead of a triangular shaped body as seen in the embodiment shown in FIGS. 1A-1C. For similarly sized boxes, the inner rectangular compartment 39 of this embodiment would provide a greater volume than the triangular compartment of the foregoing embodiment. The three rectangular shaped compartments 39a, 39b, 39c, are shown separately holding a volume of woods chips 41 (center compartment) and fluids 43 (side compartments) in close proximity to each other as in the previous embodiment. The hinged lid 45, which provides a top cover for the top opening 40 of inner compartment 39, is seen to have vent holes in the form of elongated slots 47 extending substantially the length of the lid. Slots 47 preferably extend over all of the compartments 39a, 39b, 39c to permit wood smoke and moisture to efficiently vent out of the box and into the region of the barbeque were the food is being cooked.

Figure 3:
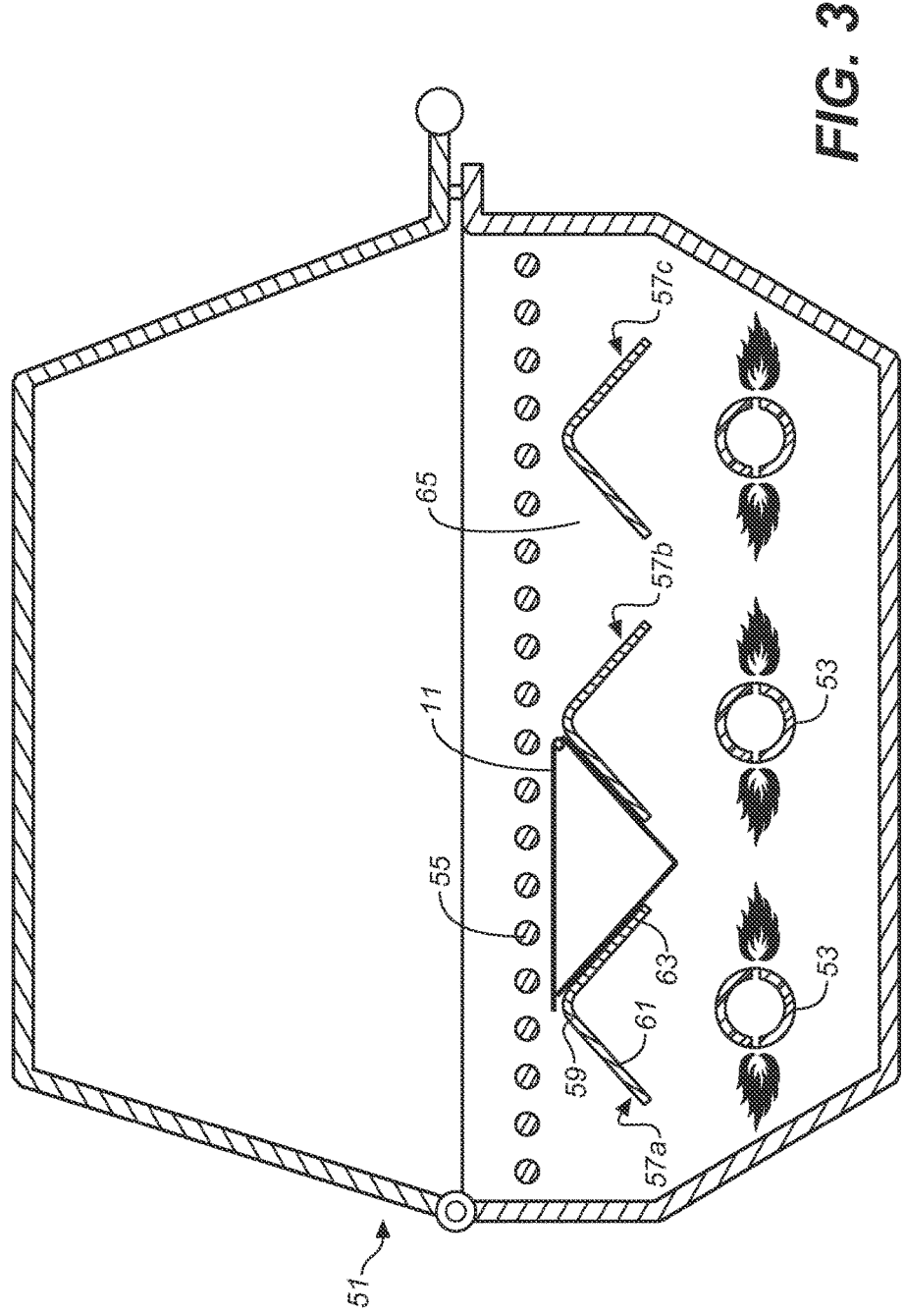
FIG. 3 is a graphical representation of an exemplary barbecue grill showing how a smoker box such as shown in FIGS. 1A-1C would be placed in the barbecue.
Figure 4A:
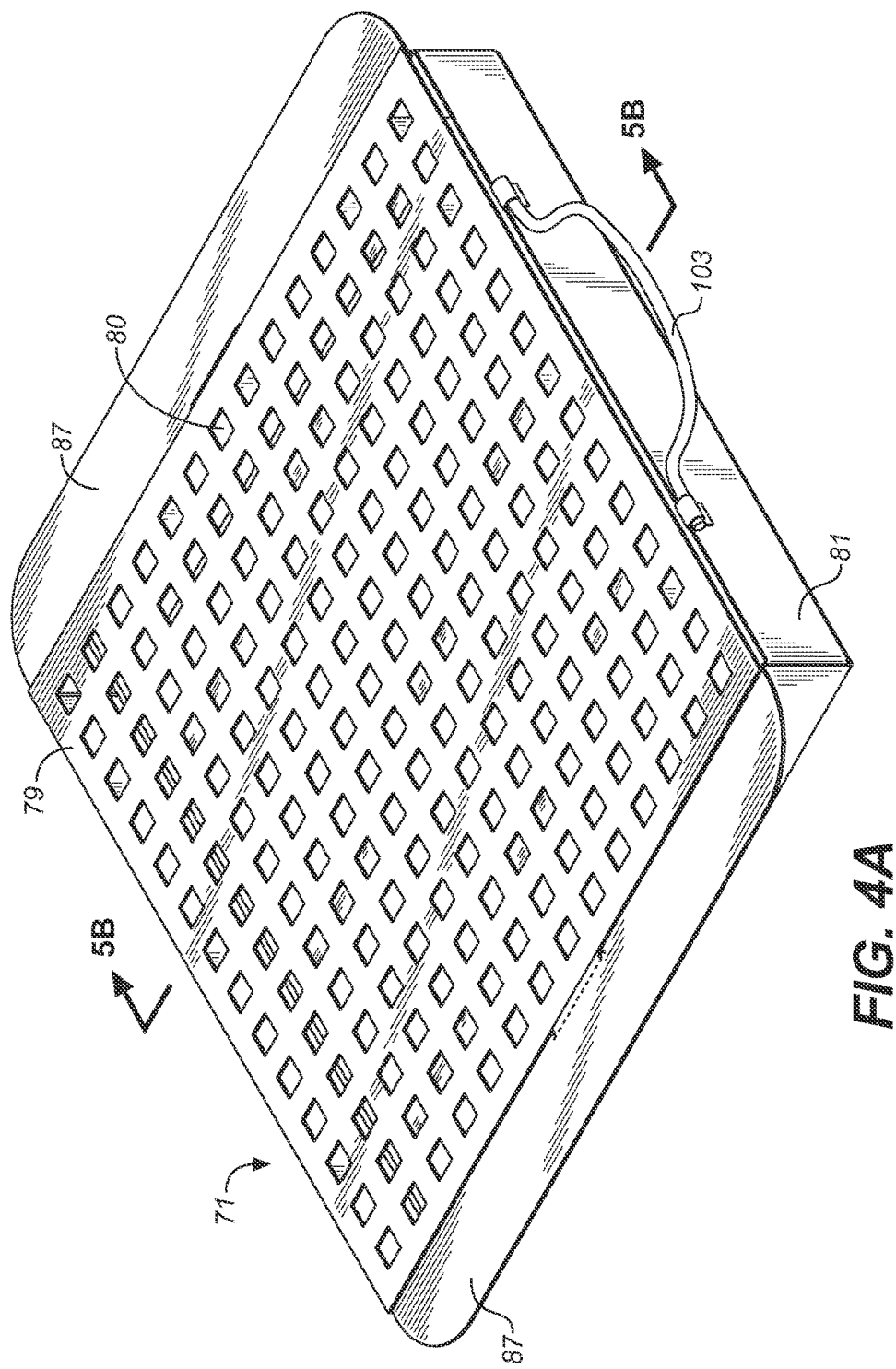
FIG. 4A is a top perspective view of yet another embodiment of a smoker box with integrated humidifier in accordance with the invention showing the accessible wood chip and fluid holding tray of the smoker box in a closed position.
Figure 4B:
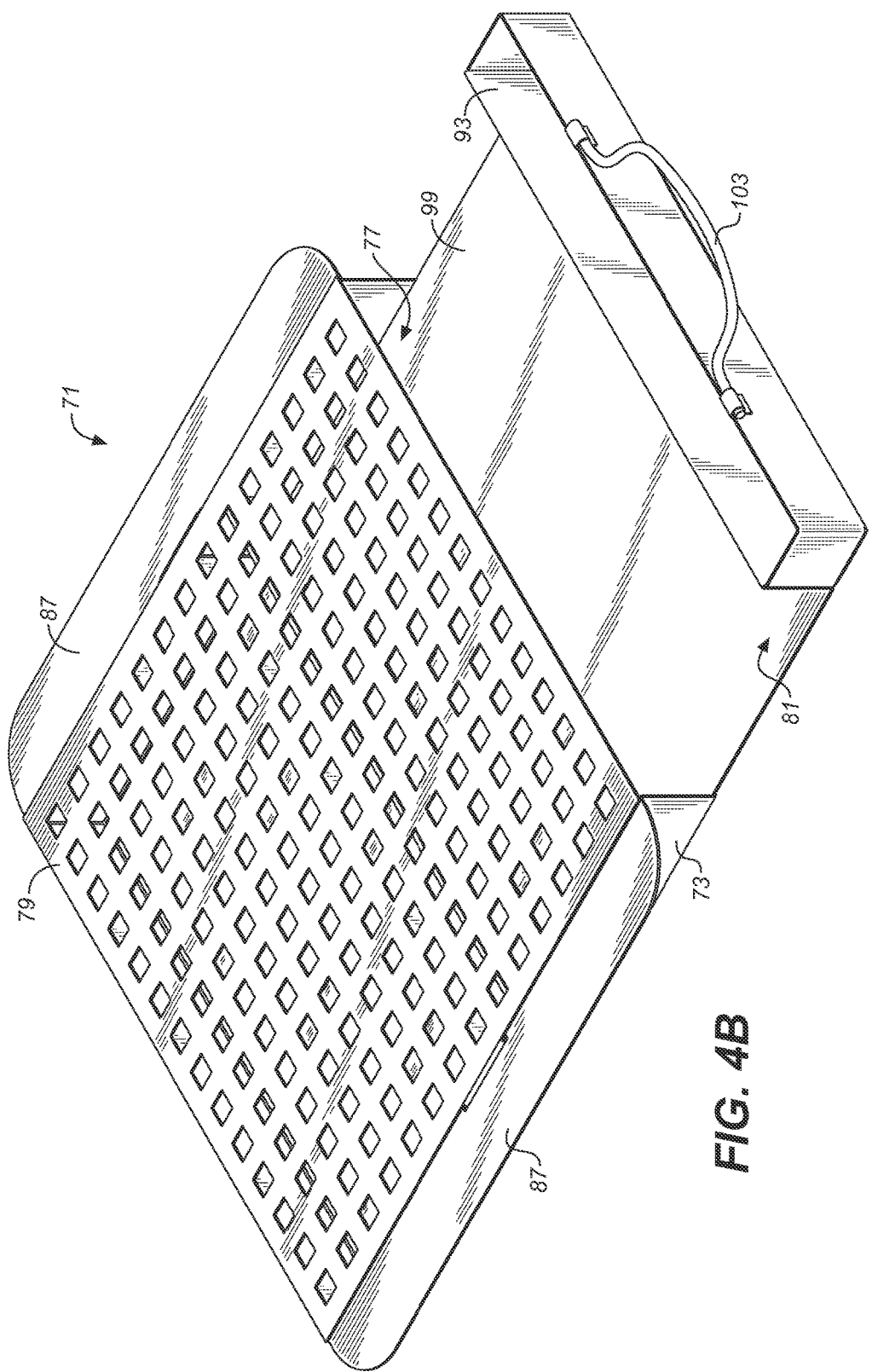
FIG. 4B is a top perspective view thereof showing the accessible wood chip and fluid holding tray of the smoker box in an open position.
Figure 5A:
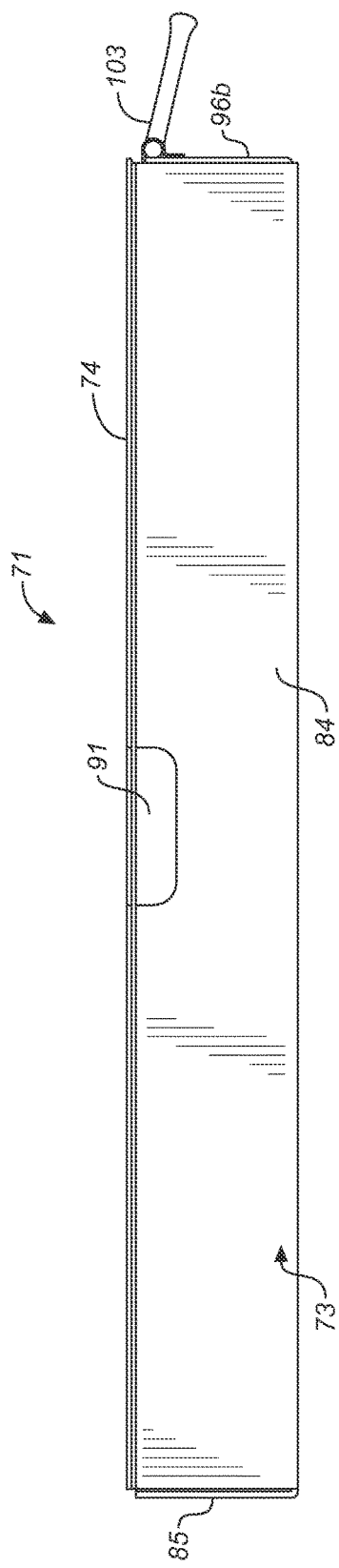
FIG. 5A is a side elevational view thereof.
Figure 5B:
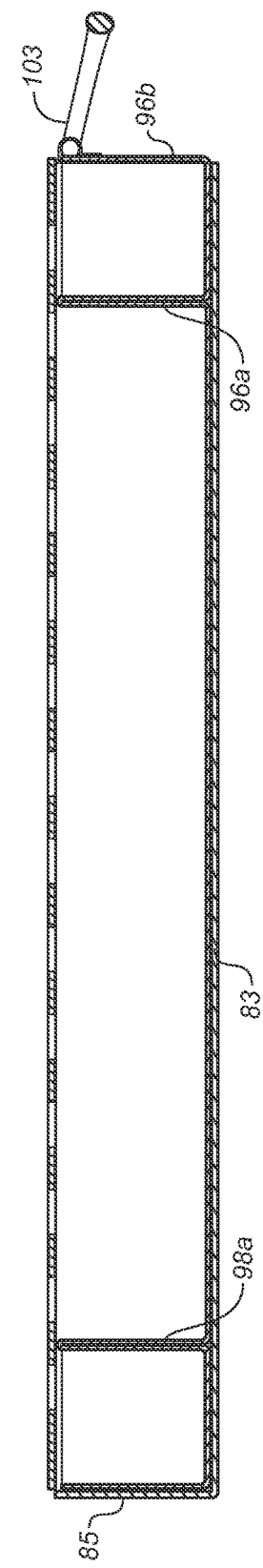
FIG. 5B is a cross-sectional view thereof taken along section lines 5B-5B in FIG. 4A.

FIG. 3 illustrates how a triangularly shaped smoker box in accordance with the invention such as shown in FIGS. 1A-1C would be placed in a barbeque having wedge shaped heat deflector bars. In FIG. 3, the illustrated gas cooking grill 51 is seen to have a heat source in the form of parallel gas burners 53, a cooking grate 55 above the burners, and parallel heat deflector bars 57a, 57b, 57c positioned above the gas burners between the burners and the grate. Each heat deflector bar has an apex 59 and walls 61, 63 that spread downwardly away from the apex. The spread walls of the heat deflector bars are seen to form a series of triangularly shaped trough regions 65 between adjacent bars in which the triangularly shaped smoker illustrated in FIGS. 1A and 1B can be placed so as to be operatively supported below the barbecue grate 55 on which the food is set.

FIGS. 4A-4C and 5A-5B illustrate yet another smoker box in accordance with the invention having a drawer that can be pulled out to replenish the fluids and wood chips in the smoker box. In this version of the invention, smoker box 71 is comprised of a container body in the form of a base pan 73 having a top 74 with top opening 75 and a front end opening 77. A perforated top cover plate or lid 79 fits over the top opening of the base pan thus forming the top of the smoker box, and drawer 81 for the wood chips and fluids slides into the open end 77 of the base pan. Perforated cover plate 79 and the underlying base pan 73 are preferably sized to provide enough surface area on the cover plate to support food directly on the smoker box. By providing a cooking surface on top of the smoker box the food can be placed in close proximity to the source of the flavoring smoke and moisturizing vapor.

The base pan is suitably formed by a bottom wall 83, vertical side walls 84, and a back wall 85, and can have side support structures, suitably in the form of side plates 87 extending outwardly from the top of pan's side walls 84, which can serve as handles for lifting the smoker box. Capture slots 89 can be provided in the side plates for receiving tabs 91 projecting downwardly from the side edges 92 of top plate 79. The tabs 91 will act to hold the top plate in place when the top plate is set onto the base pan.

The drawer, which is part of the container body, is divided into isolated sections or compartments for holding both wood chips and a fluid. In the illustrated embodiment the drawer has two narrow front and back fluid holding compartments 93, 94, each of which is bounded on four sides by vertical walls, namely, narrow walls 95, 97 and long walls 96a, 96b and 98a, 98b. A center region or compartment 99 for holding wood chips is formed between the two fluid holding compartments such that there is a relatively large compartment for wood chips and two smaller fluid compartments. When the drawer is pulled out of the base pan, this center compartment is sideless, being formed by the bottom drawer wall 101 and the interior vertical walls of 96a, 98a of the fluid holding trays. When slid into the base pan, this center compartment becomes bounded on the sides by the side walls 83 of base pan 73 for containment of the woodchips placed on the bottom drawer wall 101 when the drawer is pulled out. Providing a partially sideless drawer has particular advantages. When the drawer is slid out of the base pan to replenish the wood chips, the spent wood chips can easily be scrapped out of the drawer into a container for disposal or storage.

Figure 6:
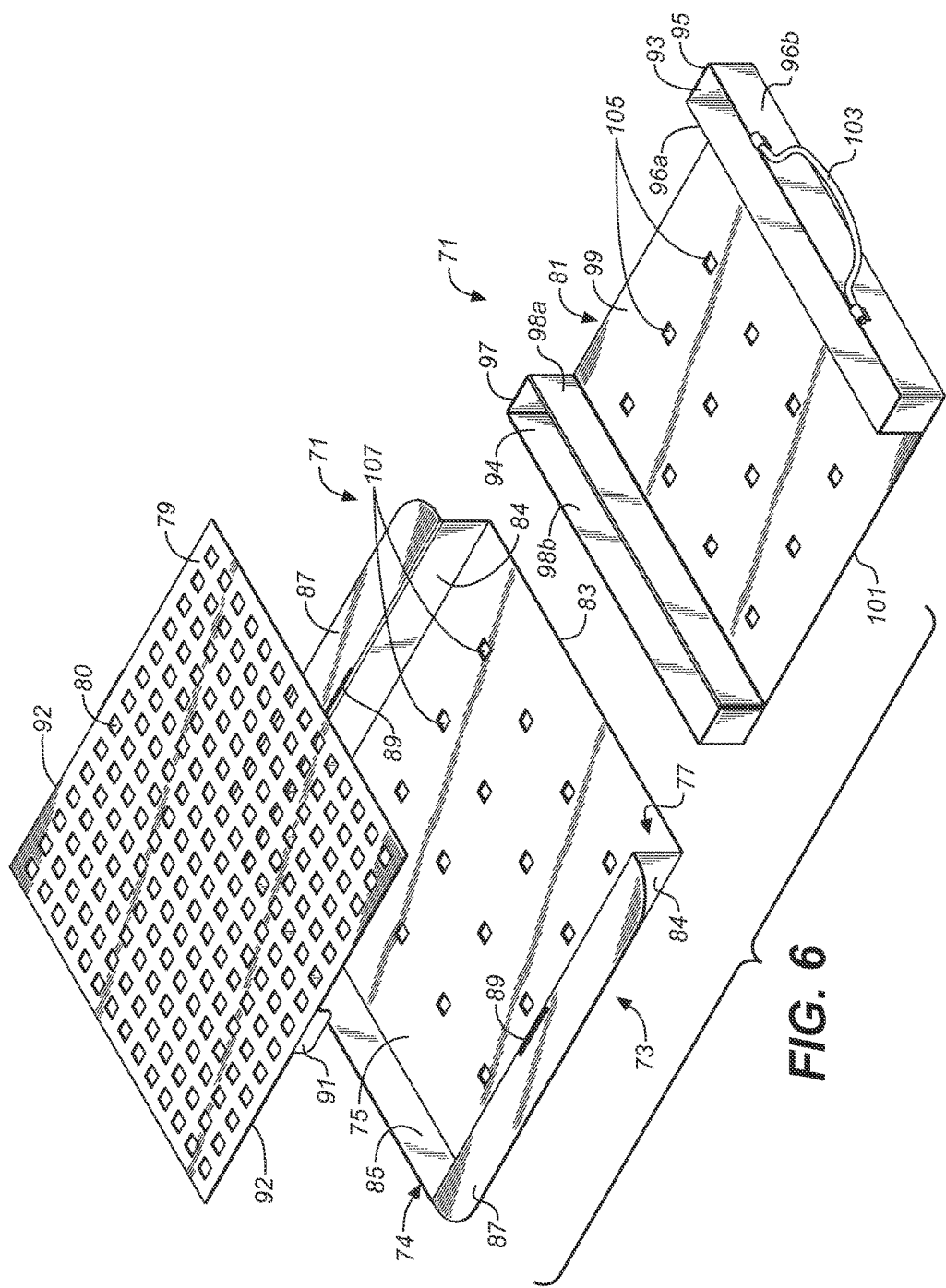
FIG. 6 is an exploded top perspective view of a further embodiment of the invention, which improves circulation of smoke and humidifying vapor within the barbecue grill.

FIG. 6 shows a further embodiment of the invention in which improvements are achieved in the circulation of smoke and humidifying moisture within the barbecue grill. In this embodiment, an array of air passage openings 105 is distributed about the center region of the bottom wall 101 of drawer 81 which support the wood chips, while a corresponding array of air passage openings 107 is provided in the bottom wall 83 of the base pan 73. The openings 105 in the drawer's bottom wall are positioned such that they register with the openings 107 in the base pan's bottom wall when the drawer is pushed all the way in to an operative position within the base pan. In the illustrated embodiment, the drawer is in an operative position when the back of the drawer reaches the base pan's back wall 85. While the air passage openings in the base pan and drawer are shown as square openings, it will be understood that openings of other shapes could be used and that the openings would not have to be provided in a uniform array. For example, a distribution of circular or triangular openings could be provided, or the openings could be in the form of long narrow rectangular openings. Also, the openings on the bottom wall of the drawer could be a different shape than the openings in the base pan's bottom wall, provided the opening register when the drawer is pushed in to an operative position. It is also contemplated that a single air passage opening could be provided in the drawer for registering with one or more openings in the base pan, or that.

When the drawer 71 shown in FIG. 6 is pushed all the way in to its operative position resulting in the registration of hole arrays 105 and 107 in the drawer and the base pan, air passages are created in the bottom of the smoker boxes that allow air to circulate through the smoker box. Due to the raising heat from the barbecue's heat source, air will be drawn up through the bottom of the smoker box and circulate into regions above the smoker box where food being cooked is located. This air circulation can be enhanced by providing a suitably placed fan attachment for the barbecue grill.

When used, the version of the smoker box shown in FIG. 4A through FIG. 6 can be set on top of the grill grate of a barbecue grill with the drawer 71 pre-filled with wood chips and fluids as above described, or the wood chips and fluids can be loaded in the drawing when the smoker box is setting on the barbecue grill using an oven mitt or tongs to open and shut the drawer. Food to be cooked can then be placed on top of the smoker box's cover plate 70 whereupon the food will receive flavoring smoke and moisturizing vapor from the heated wood chips and fluids contained in the drawer of the box beneath the food. Wood chips and fluid can be replenished while the smoker box remains on the grill and while the food is still cooking. Again, to accomplish this, the drawer would be handled with an oven mitt or tongs.

While various embodiments of the invention have been described in considerable detail in the foregoing specification, it is not intended that the invention be limited to such detail except as necessitated by the following claims.

What we claim is:

1. A smoker box and humidifier for a barbecue grill comprising:
   a container body having a long direction and a top and at least one top opening at its top sized to allow smoke and moistening vapors to pass therethrough, and
   at least three isolated side-by-side compartments forming a row of contiguous compartments in said container body in the long direction thereof, each of said at least three compartments being configured to hold wood chips and a liquid, wherein a liquid held in any one or two of said compartments is in close proximity to wood chips held in the other two or one of said compartments wherein moistening vapors are produced in conjunction with flavoring smoke when the smoker box is heated, the compartments in said container body being positioned wherein both the flavoring smoke and moistening vapors produced in the compartments when the smoker box is heated circulate up through the at least one top opening in the top of said container body.

2. The smoker box and humidifier of claim 1 wherein the top of the container body includes a plurality of openings sized to allow smoke and moistening vapors to pass therethrough.

3. The smoker box and humidifier of claim 1 further comprising a top cover for covering the top opening of said container body above the isolated compartments therein, the at least one opening in said top cover being positioned wherein both the flavoring smoke and moistening vapors produced in the compartments when the smoker box is heated circulate up through the at least one top opening in the top cover of said container body.

4. The smoker box and humidifier of claim 3 wherein the top cover of the container body includes at least one opening above each of the compartments of the container body to provide a plurality of openings through which smoke and moistening vapors can pass.

5. The smoker box and humidifier of claim 3, wherein said top cover is a lid hinged to the top of the container body.

6. The smoker box and humidifier of claim 1 wherein said container body has an elongated generally inverted triangular shape and wherein at least three isolated compartments are provided along the length of said container body.

7. The smoker box and humidifier of claim 1 wherein said container body has an elongated generally rectangular shape and wherein the at least three isolated compartments are provided along the length of said container body.

8. A smoker box and humidifier for a barbecue grill comprising:
   a container body having a top opening and a long direction,
   at least three isolated side-by-side compartments forming a row of contiguous compartments in said container body in the long direction thereof, each of said at least three compartments being configured to hold wood chips and being configured to hold a liquid, wherein a liquid held in any one or two of said compartments is in close proximity to wood chips held in the other two or one of said compartments wherein moistening vapors are produced in conjunction with flavoring smoke when the smoker box is heated, and
   a top cover for covering the top opening of said container body above the isolated compartments therein, said top cover having a plurality of openings distributed therein wherein both the flavoring smoke and moistening vapors produced in the compartments of the container body when the smoker box is heated circulate up through the plurality of top openings in the top cover.

9. A smoker box and humidifier for a barbecue grill comprising
   an elongated container body having a long dimension and having a top, a bottom and at least one top opening at its top through which smoke and moistening vapors can pass, and
   at least one substantially vertical thin divider wall positioned in said container body and oriented perpendicular to said long dimension thereof so as to form at least two separate and contiguous compartments therein and in the direction of the container body's long dimension, at least one of said compartments being configured to hold a liquid, said divider wall extending from the bottom to substantially the top of said container body wherein the compartments formed thereby are isolated one from the other and wherein wood chips held in one compartment and liquid held in the other compartment are in close proximity to each other, wherein moistening vapors are produced by a liquid held in one of said compartments and flavoring smoke is produced by wood chips in the other contiguous but isolated compartment when the smoker box is heated, and wherein both the flavoring smoke and moistening vapors thusly produced circulate up through the at least one top opening in the top of said container body.

10. The smoker box and humidifier of claim 9 wherein the said container body has at least two vertical divider walls forming at least three isolated compartments, wherein a liquid held in any one or two of said compartments is in close proximity to wood chips held in the other two or one of said compartments wherein moistening vapors are produced in conjunction with flavoring smoke when the smoker box is heated.

11. The smoker box and humidifier of claim 9 further comprising a top cover for covering the top opening of said container body above the isolated compartments therein, the at least one opening in said top cover being positioned wherein both the flavoring smoke and moistening vapors produced in the compartments when the smoker box is heated circulate up through the at least one top opening in the top cover of said container body.

12. The smoker box and humidifier of claim 11 wherein the top cover of the container body includes at least one opening above each of the compartments of said container body.

13. The smoker box and humidifier of claim 11 wherein the top cover of the container body includes at least one opening extending over each of the compartments of said container body.

\* \* \* \* \*